E. COLLETT.
PROCESS OF CONCENTRATING ACID SUCH AS NITRIC ACID BY MEANS OF A DRYING AGENT.
APPLICATION FILED NOV. 11, 1912.
1,079,541.  Patented Nov. 25, 1913.
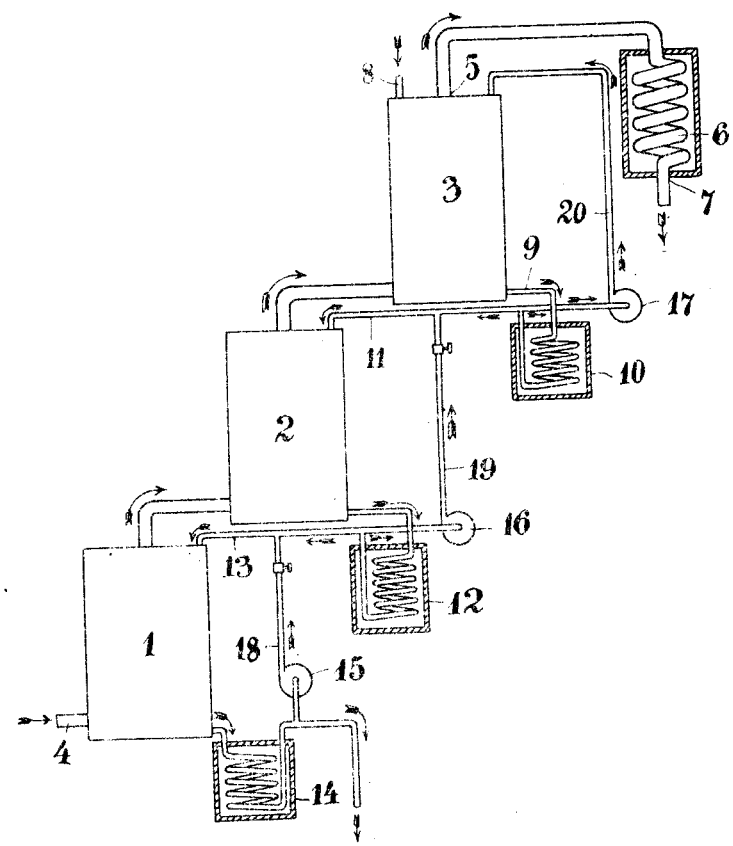
Witnesses:
B. Dommers
E. Leckert
Inventor
Emil Collett.
By Harry ...... Atty

UNITED STATES PATENT OFFICE.

EMIL COLLETT, OF CHRISTIANIA, NORWAY, ASSIGNOR TO NORSK HYDRO-ELEKTRISK KVAELSTOFAKTIESELSKAB, OF CHRISTIANIA, NORWAY.

PROCESS OF CONCENTRATING ACID SUCH AS NITRIC ACID BY MEANS OF A DRYING AGENT.

1,079,541.  Specification of Letters Patent.  Patented Nov. 25, 1913.

Application filed November 11, 1912. Serial No. 730,822.

*To all whom it may concern:*

Be it known that I, EMIL COLLETT, a subject of the King of Norway, residing at Christiania, Norway, have invented certain new and useful Improvements in Processes of Concentrating Acid such as Nitric Acid by Means of a Drying Agent; and I do hereby declare the following to be a full, clear, and exact description of the invention, such as will enable others skilled in the art to which it appertains to make and use the same.

This invention has for its object a process of concentrating acids by means of a drying agent such as sulfuric acid. It is known to effect the concentration of nitric acid by means of passing nitric acid vapors through a column in counter current with sulfuric acid. Such a process is for instance described in the U. S. Patent No. 517,098. When the nitric acid vapors treated are weak and the sulfuric acid previously heated, it occurs that the heat produced by the reaction and condensation raises the sulfuric acid, to the boiling point, and in consequence thereof the drying will not be efficient. In order to obtain an efficient drying under these circumstances large amounts of sulfuric acid have to be employed. In order to reduce the consumption of sulfuric acid the column might be subject to cooling from outside or inside by means of a cooling jacket or a cooling worm respectively. In the first event however the cooling will not be very efficient and in the case of a cooling worm being employed there is a risk that on account of leakages cooling liquid may enter into the drying apparatus. Now according to applicant's invention an efficient drying and also a rational utilization of the drying agent is obtained in that the drying operation is carried out in several sections and the drying agent cooled after each section before it is passed into the next section so that it may again act as a water absorbent. As the vapors are passed in counter current with the drying agent, the vapors, containing the largest percentage of water will first pass through the drying agent which is nearly exhausted, but whose property as a water absorbent has been restored to some extent on account of the previous cooling of the same.

The process may advantageously be carried out in the manner that in the first section or sections the greatest part of the humidity and the heat evolved by the absorption of this latter is eliminated by means of a comparatively large amount of drying agent of a lower degree of concentration which circulates upon the apparatus and whose degree of concentration is maintained nearly constant. On account of the drying agent being employed in comparatively larger amounts injurious raises in temperature are prevented, and if a special cooling of the circulating drying agent is necessary, this may be easily effected according to the present invention by inserting a suitable cooling appartus in the circulation system at a suitable point in this latter (outside of the drying apparatus). The gases or vapors pre-dried in this manner are thereupon introduced into another apparatus where they are being treated with a smaller amount of a drying agent of a higher degree of concentration. Here the drying of the vapors or gases is thereupon carried out to the desired extent. The concentration of the drying agent which leaves this section has been only slightly reduced and it may therefore be employed for the purpose of maintaining the concentration of the circulating drying agent of the first system constant. An amount of drying agent corresponding to the new amounts supplied is of course withdrawn from the drying apparatus.

A plant for concentrating nitric acid according to the present invention is diagrammatically illustrated in the accompanying drawing.

The nitric acid vapors to be dried are introduced at 4 into the lower tower 1 of the drying columns 1, 2 and 3, while the dried vapors escape at 5 from the upper towers 3 and are led into a condenser 6 from which the concentrated acid is drawn off at 7 in a liquid state. Concentrated drying agent is introduced at 8 at the top of the tower 3 and flows in a somewhat diluted state from the bottom of the tower through the pipe 9, cooler 10 and pipe 11 into the second tower 2 from which it passes in a still more diluted state through the cooler 12 and pipe 13 into the tower 1. A greater or smaller part of the cooled liquid leaving the cooler 10, 12 or 14 respectively may be forced back into the top of the towers 1, 2 or 3 respectively, by means of the centrifugal pumps 15, 16, 17, inserted in the conduits 18, 19 or 20 respectively. When the concentration of the acid is carried out in this manner several important advantages over prior processes are obtained for instance that the consumption of drying agent is reduced to a minimum, which is of the greatest importance for the economy of such processes. Moreover when the sulfuric acid employed as a drying agent is to be employed again only a quite small amount of sulfuric acid will have to be subjected to concentration and this again results in a decrease in the costs of the concentration.

I claim:

1. The process of concentrating acids, such as nitric acid, which comprises passing a current of acid vapor to be concentrated against a counter current of a drying agent, withdrawing the latter from contact with the vapor at one zone of the current and introducing it into the current at another zone and cooling the agent during its passage from one zone to another.

2. The process of concentrating acid, such as nitric acid, which comprises passing an ascending current of acid vapor against a counter current of a drying agent, withdrawing the latter from contact with the vapor at one zone of the current of acid vapor, cooling the withdrawn agent, and introducing the cooled agent into the current of acid vapor in a zone near the zone of withdrawal.

3. The process of concentrating acid, such as nitric acid, which comprises passing an ascending current of acid vapor against a counter current of a drying agent, withdrawing the latter from contact with the vapor at one zone of the current of acid vapor, cooling the withdrawn agent, and introducing the cooled agent into the current of acid vapor in zones near to and distant from the zone of withdrawal.

4. The process of concentrating acids, such as nitric acid, which consists in establishing an ascending current of acid vapor, passing a drying agent in a counter current against the acid vapor, withdrawing the drying agent from the vapor in certain zones of the current, cooling the withdrawn agent, and introducing the cooled agent into the current of vapor at two different zones of the current.

In testimony that I claim the foregoing as my invention, I have signed my name in presence of two subscribing witnesses.

EMIL COLLETT.

Witnesses:
M. N. GUTTORNESEN,
RUTH LINDSTRÖM.